(12) United States Patent
Martin

(10) Patent No.: US 7,519,710 B2
(45) Date of Patent: Apr. 14, 2009

(54) CLIENT SERVER NETWORKS

(75) Inventor: Stephen Ian Martin, Dorset (GB)

(73) Assignee: Ericsson AB, Stockholm (SE)

( * ) Notice: Subject to any disclaimer, the term of this patent is extended or adjusted under 35 U.S.C. 154(b) by 684 days.

(21) Appl. No.: 10/490,040

(22) PCT Filed: Sep. 18, 2002

(86) PCT No.: PCT/GB02/04234

§ 371 (c)(1),
(2), (4) Date: Sep. 23, 2004

(87) PCT Pub. No.: WO03/026244

PCT Pub. Date: Mar. 27, 2003

(65) Prior Publication Data

US 2005/0038891 A1    Feb. 17, 2005

(30) Foreign Application Priority Data

Sep. 18, 2001    (GB) ................... 0122507.7

(51) Int. Cl.
*G06F 15/173* (2006.01)
(52) U.S. Cl. .............. 709/226; 709/223; 709/224; 709/225; 709/229; 718/105
(58) Field of Classification Search ........... 709/223, 709/224, 225, 226, 228, 229; 708/802, 236, 708/230
See application file for complete search history.

(56) References Cited

U.S. PATENT DOCUMENTS

| | | | | |
|---|---|---|---|---|
| 5,649,103 A * | 7/1997 | Datta et al. | ................. | 709/203 |
| 5,664,106 A * | 9/1997 | Caccavale | ................... | 709/224 |
| 5,668,951 A * | 9/1997 | Jain et al. | ................... | 709/235 |
| 5,946,686 A * | 8/1999 | Schmuck et al. | .............. | 707/10 |
| 6,138,159 A * | 10/2000 | Phaal | ........................ | 709/226 |
| 6,560,717 B1 * | 5/2003 | Scott et al. | ..................... | 714/4 |
| 6,587,881 B1 * | 7/2003 | Agarwal et al. | ............ | 709/225 |
| 7,321,926 B1 * | 1/2008 | Zhang et al. | ................ | 709/220 |
| 7,383,331 B2 * | 6/2008 | Takahashi et al. | ........... | 709/224 |
| 2001/0022615 A1 * | 9/2001 | Fernandez et al. | .......... | 348/143 |
| 2002/0055980 A1 * | 5/2002 | Goddard | .................... | 709/217 |

FOREIGN PATENT DOCUMENTS

WO    WO 00/14633    3/2000

OTHER PUBLICATIONS

Shockabsorber, A Top Connection Router (Extended Abstract), German Goldzmidt, et al., IBM T. J. Watson Research Center, pp. 1-5.

* cited by examiner

*Primary Examiner*—Saleh Najjar
*Assistant Examiner*—Marie Georges Henry
(74) *Attorney, Agent, or Firm*—Kirschstein, et al.

(57) ABSTRACT

A client node in a network communicates with a server system having a plurality of servers. The client has a distributor which periodically measures server activity, assesses relative loading of the servers, and adjusts the request distribution as well as the server loadings in accordance with the loading assessment.

19 Claims, 6 Drawing Sheets

Note*: This operation is invoked on every server object instance

Note* : This operation is invoked on every server object instance

CLIENT SERVER NETWORKS

This invention relates to client server networks and, in particular, to networks in which clients have multiple alternative servers that can handle their requests.

In such client server networks, a problem arises in determining to which of the server nodes a client should send a given request. Known methods of dealing with this problem include load sharing, in which the load is spread across the multiple servers on a round robin basis, and worker standby schemes in which a server is designated as the worker to which requests are usually sent but an alternative server, the standby, handles requests when the worker is unable to. When the worker is again able to handle requests, the requests are again sent to it. However, neither of these approaches is satisfactory. Round robin load sharing is unsuitable if the capacities of the various servers differ significantly as the approach does not take relative server size into account. Worker-standby approaches are unsuitable if the request volume exceeds the capacity of a single server.

The effective capacity of any given server can vary considerably over time, for example because the server is handling requests from other clients, or for other reasons such as maintenance activity, such as archiving.

The present invention aims to address the problems outlined above and to provide an improved handling of requests to multiple servers.

According to the invention there is provided a method of distributing requests from a client node to servers of a server system having a plurality of servers, the method comprising periodically repeating the steps of:

measuring the activity of each server;

assessing the relative loadings of the plurality of servers from the measured server activities; and adjusting the distribution of requests to individual servers of the plurality of servers in accordance with the assessment of relative loadings;

wherein adjusting the distribution of requests to individual servers comprises adjusting the proportion of requests assigned to each server as a function of measured server activity, the mean activity across the plurality of servers, and the existing proportion of requests assigned to the server.

The invention also provides a system for distributing requests from a client node to servers of a server system having a plurality of servers, comprising a distributor at the client node, the distributor including means for measuring the activity of each server, means for assessing the relative loading of the plurality of servers from the measured server activities, and means for adjusting the distribution of requests to individual servers of the plurality of servers in accordance with the assessment of relative loadings;

wherein the distribution adjustment means comprises means for adjusting the proportion of requests assigned to each server as a function of measured server activity, the mean activity across the plurality of servers and the existing proportion of requests assigned to the server.

Embodiments of the invention have the advantage that load distribution can be even across servers, taking into account their relative capacities.

Preferably, the client node comprises a load controller for applying a load control algorithm to the requests distributed to all servers of the plurality of servers. This has the advantage that loads can be controlled to prevent all the servers overloading and that the distributor makes the plurality of servers look like a single server.

Preferably, server activity is measured by counting the number of server requests and responses over a period. Preferably, this period is an aggregate number of requests.

Preferably, the assessing of relative loading comprises comparing the server requests and responses for each of the servers over the sample period.

Preferably, the request distribution of the server is adjusted according to a function of measured server activity, mean activity across all the servers and the existing proportion of requests assigned to the server.

Preferably, an override facility is provided whereby a request related to a previous request is sent to the same server as the previous request.

Embodiments of the invention will now be described, by way of example, and with reference to the accompanying drawings in which.

Figure 1:
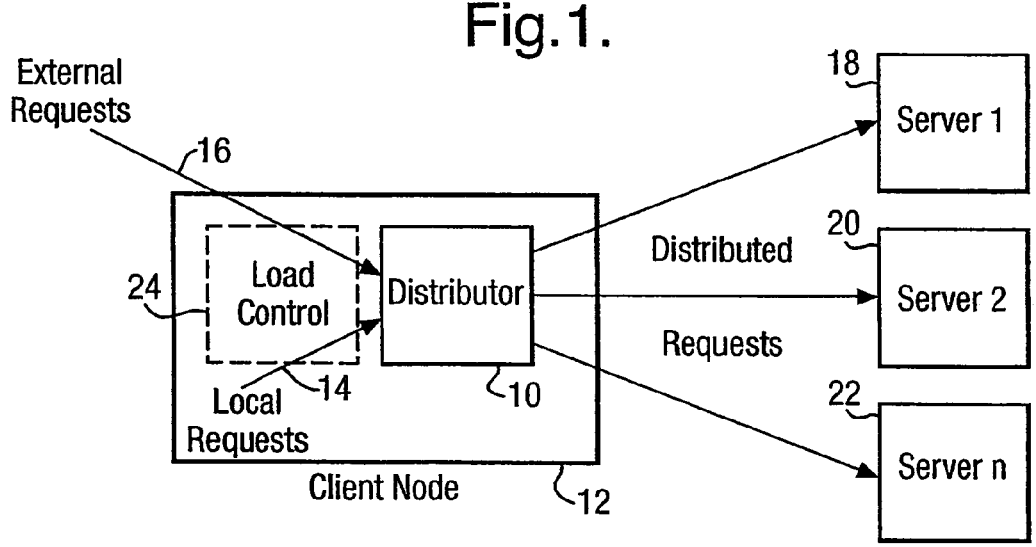
FIG. 1 shows a schematic diagram of a request distribution system embodying the invention.

Referring to FIG. 1, the embodiment to be described is based on a request distributor unit 10, within each client node 12. The request distributor receives both local requests 14 generated internally within the client node and external requests 16 received over an external interface. The distributor distributes server requests among n servers, here shown as server 1, 18, server 2, 20 and server n, 22. The client node also comprises a load control unit 24 which runs a load control algorithm. The distributor ensures that the remote servers are evenly loaded. The distributor is effectively front ended by the load control algorithm.

The architecture illustrated in FIG. 1 enables the same load control to be used for external requests and requests originating locally at the client node. Also, the distributor makes the server network look like a single node to the load control algorithm. It can be seen from FIG. 1 than the distributor is positioned, logically, between the servers and the load control.

Distributing the load to the servers on a request by request basis does not work when a request is related to an earlier request. The distributor includes an override facility which enables some subset of requests to be sent to the same server. This is typically necessary where the server stores content derived from the first request that is needed to process the subsequent requests.

Figure 2:
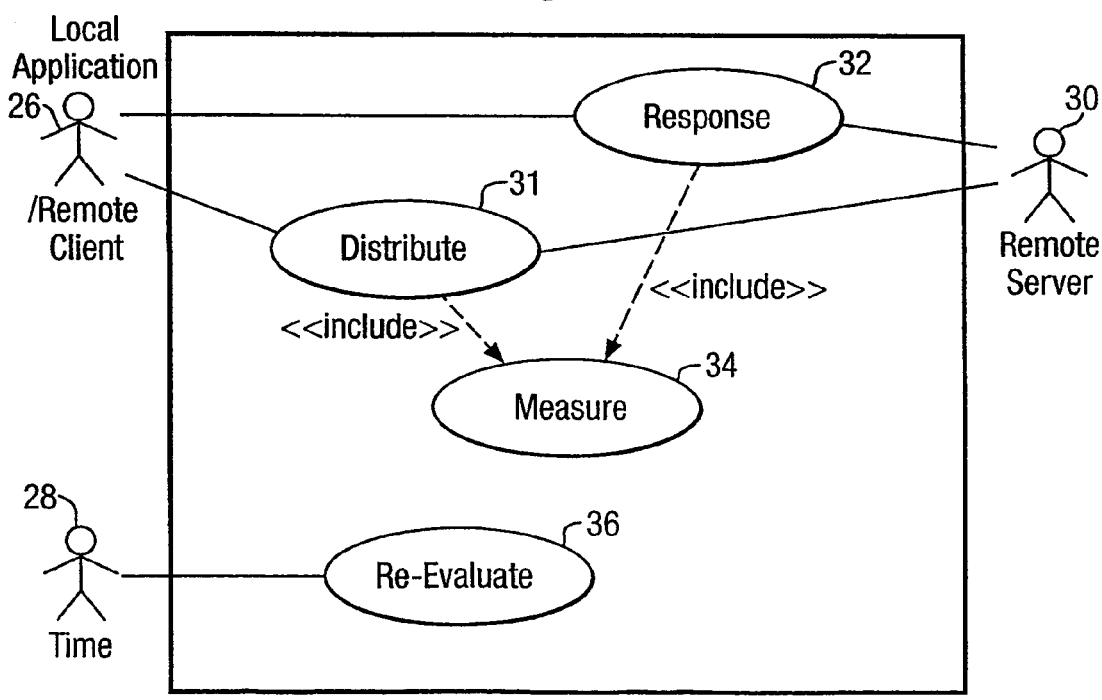
FIG. 2 is a UML use case diagram for the distributor of FIG. 1.

The UML use cases for the distributor are shown in FIG. 2. The local application or remote client 26, time 28 and remote server 30 are shown as being remote from the system. The diagram shows that the distributor distributes 31 server requests in accordance with responses 32 from the servers and some measure 34 based on distribution and response. The distribution is re-evaluated over time 36.

Irrespective of the origin of the server request, that is external or internal to a client node, three requirements for distributing server requests to a set of available servers may be identified as follows:

1. To load the available servers evenly, as far as possible;
2. To avoid high frequency oscillations in server load by not overreacting to past load imbalances, causing new load imbalances; and
3. To allow override requests to insist on a specific server despite the distribution algorithm.

The override request of requirements is invoked when a subsequent request requires context data that would have been created in the server that handled a previous request. The response to the previous request indicated which server handled it.

The distribution used should preferably be independent of the particular details of the client-server protocol to ensure wide applicability. In the embodiments to be described, the measurements for different servers are compared to assess their relative loadings. The distribution of subsequent requests is then adjusted to converge the server measurement to their mean. Thus, the loadings of the servers are rebalanced. This approach has no idea of whether the individual servers are overloaded as it is a relative measure of loading and so does not provide a complete control mechanism. If there is a concern at a client node to avoid overloading servers, the client node may incorporate a separate load control algorithm in front of the distributor for example as shown at 24 in FIG. 1. The load control algorithm works from measurements of the aggregate traffic to all servers. A load control scheme suitable for a server node terminating request traffic should be equally suitable for a client node having a request distributor. It should be understood that load control is not essential.

The approach outlined above is based on measurements of relative loadings. It would be possible to measure traffic related quantities such as request and response counts and their rate derivatives, response time distributions (such as mean, $95^{th}$ percentile, and standard deviation), and numbers of requests with responses pending. Although these are all universal measurements, they suffer to a greater or less degree from the problem that the threshold separating normal from overload conditions are usually protocol and/or application specific. For example, what constitutes a satisfactory response time for one application is likely to be unacceptable for another. Thus, a design based upon testing measurements against absolute values is unsatisfactory.

In addition to the approach based on measurements of relative loadings, some protocols include an explicit facility for a server to reject client requests when it is overloaded. Distinguishing and counting these rejected requests at the distributor provides an additional set of measurements which can be used to control distribution.

Figure 3:
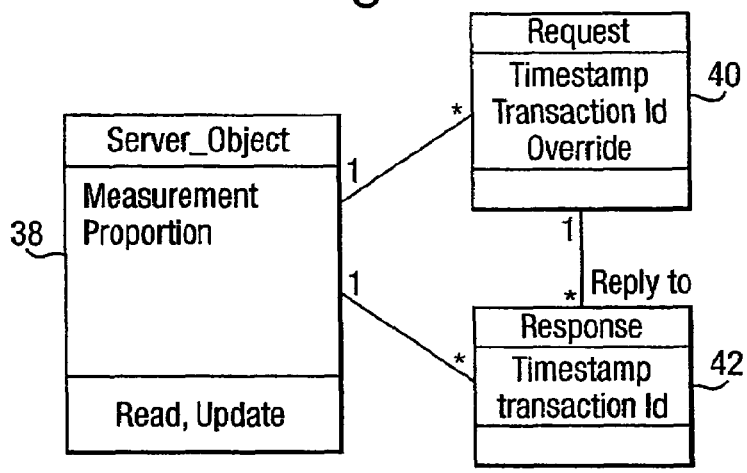
FIG. 3 is a UML class diagram for measurement of server loadings to assess relative loadings.

FIGS. 3 to 7 show generalised UML class and sequence diagrams for the distributor. FIG. 3 is a UML class diagram showing three entities: the server 38, request 40 and response 42. The server has the attributes of measurement, proportion, the request has the attributes of Timestamp, transaction ID and Override, and the response has the attributes of Timestamp and transaction ID. The server has the operations read and update.

Figure 4:
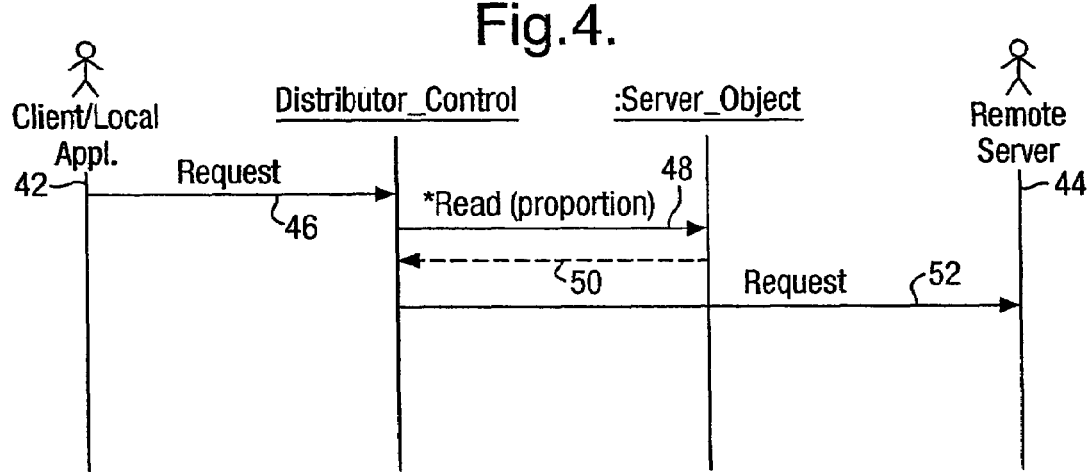
FIG. 4 is an example sequence for a Distribute use case.

FIG. 4 shows the sequence for the Distribute use case in which the client or local application and Remote Server 42, 44 are shown outside the distributor system. Requests 46 are sent to the distributor and a read operation 48 performed on every server object instance to obtain current proportions, and which includes receiving responses 50 from the server objects. The requests are then distributed 52 to the appropriate remote server 44 depending on the relative loading.

Figure 5:
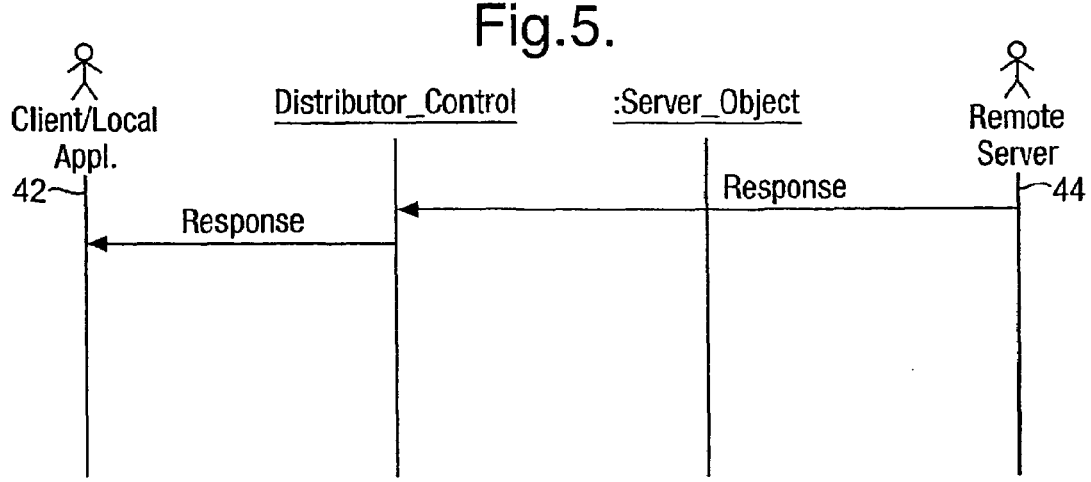
FIG. 5 is an example sequence for a Response use case.
Figure 6:
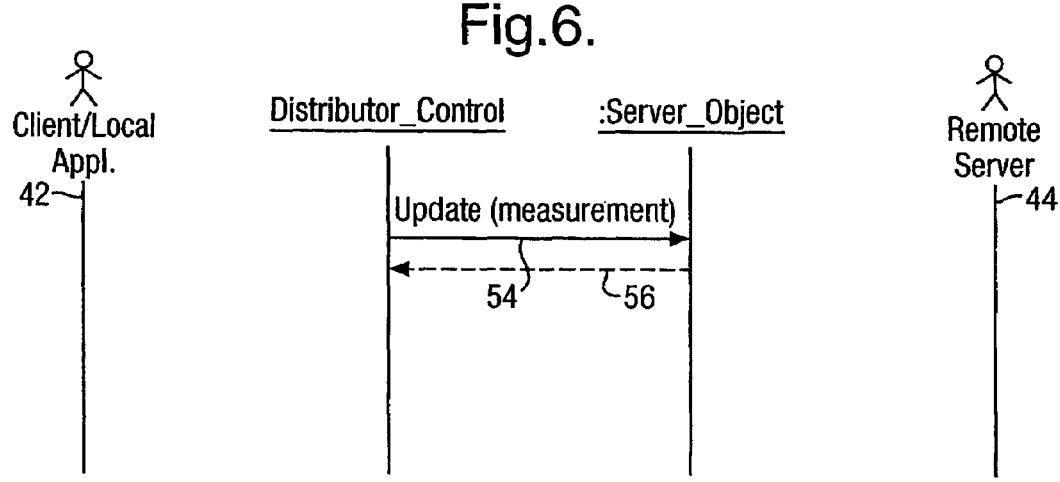
FIG. 6 is an example sequence for a Measure use case.

FIG. 5 shows the sequence for the response use case. Here, the remote server 44 sends responses to the Distributor_Control which sends the responses to the client or local application 42. FIG. 6 shows the sequence for the Measure use case in which updates to measurements 51 are made between Distribution_Control and Server_Objects and replies 56 returned to the Distribution_Control.

Figure 7:
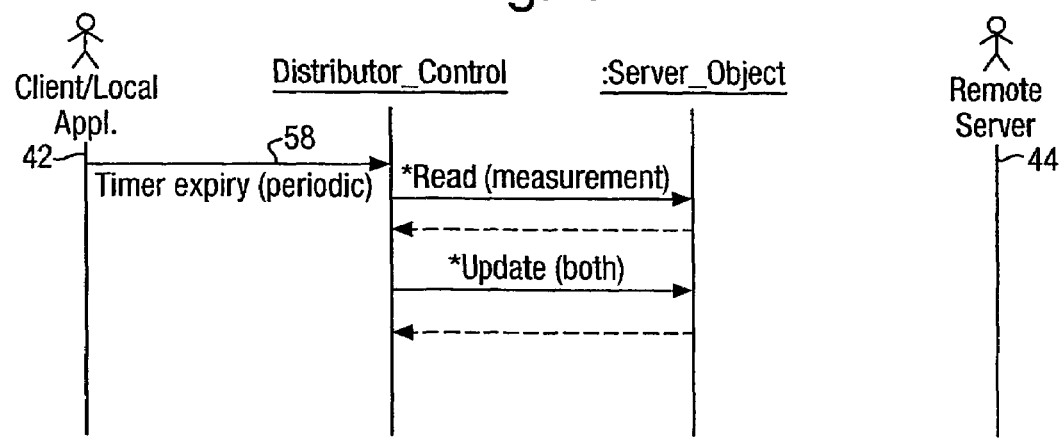
FIG. 7 is an example sequence for a Re-evaluate use case.

FIG. 7 shows the sequence for the Re-evaluate use case. The outside control here is time 58. On expiry of a timer, which is a periodic event, read measurements are made by the Distributor from the Server Objects and an update made. Both receive replies from the server objects and both are invoked on every instance of server object.

The distribution algorithm must not be disrupted by addition and removal of servers. A distribution by parts scheme is preferred although other algorithms are possible. Under the preferred scheme, the server's proportions are expressed as a ratio according to capacity. For example, in a three server case where one of the servers has twice the capacity of other two, the ratio would be expressed as 1:2:1.

The number of parts assigned to each server is P1, P2, P3 . . . Pn. In the 1:2:1 case above, P1=1, P2=2 and P3=3. The distribution algorithm adds these numbers cumulatively from the first server to the last, recording the server identity against each interval. Thus, the range P1-P2 is assigned to server 2, P2-P3 to server 3 and so on. For each server request a random number is generated in the range 0 to $\Sigma Pr(r=1-n)$. The server within whose range the random number lies is the server to which the request is sent.

Where the random number generated is equal to one of the interval boundary values, a tie breaker rule is applied.

Where the distributor starts up, it assumes that all servers have the same capacity and assigns the same proportion to each. Rather than applying the value 1, a larger value such as 10 is applied to allow for downward, as well as upward adjustments.

Figure 8:
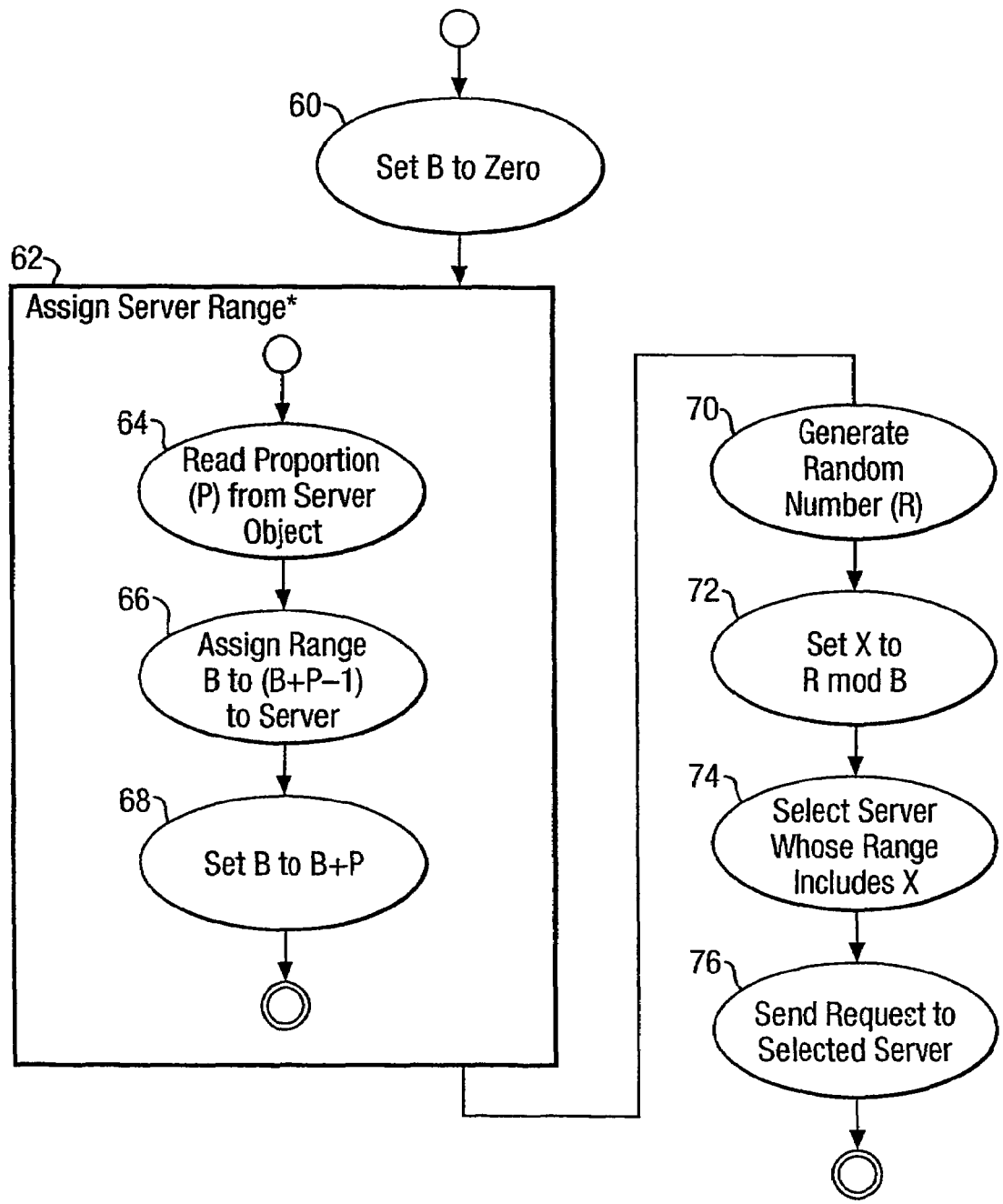
FIG. 8 is a UML activity diagram for Distribute use case.

FIG. 8 shows a UML activity diagram for the Distribute use case. At 60, Value B is set to zero. Within box 62, a server range is iterated for each server. This involves the steps of reading a proportion P from each server object 64, assigning a range B to (B+P−1) to the server 66 and then resetting the value of B to B=B+P at 68. A random number R is then generated at 70 and at 72 a value X is set such that X=R mod B. at 74, the server whose range includes X is selected and at 76 a request is sent to that server.

In the foregoing description, it has been established that the selection of which server to send a request to should be based on a relative measurement of server loadings and that distribution is achieved using an algorithm based on server capacities. The following description concerns the measurement of server loading, and describes three possible ways of measuring server loadings: response time measurements, outstanding response count; and request and response count. The latter is especially preferred but the former two methods are possible. Other methods are also possible and will occur to those skilled in the art.

Response Time Measurements

Figure 12:
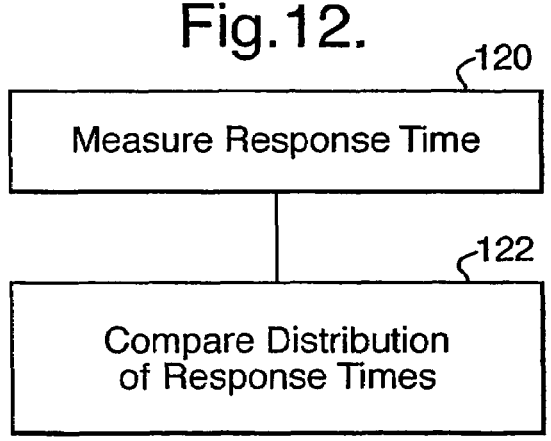
FIG. 12 is a flow chart showing a second embodiment of activity measurement.

The distributor can calculate the response time distributions of each server. The relative loadings are then evaluated by direct comparisons of the chosen measure, for example the mean or $95^{th}$ percentile. As a server becomes overloaded it should exhibit a sharp increase in its response time. This solution is illustrated in the flow chart of FIG. 12 which shows response time measurement at step 120 which is performed for all servers, followed by a comparison of the distribution of response times at step 122. This approach, although possible, suffers from a number of problems:

First, individual servers may differ substantially in their natural response times when working normally, making it more difficult to distinguish overloaded servers. Secondly, a certain minimum number of response time samples must be collected before their statistical distribution can be assessed reliably. This may make the sample periods too long and the distributor too sluggish in its reaction to changes. Third, the distributor has to associate responses with the relevant requests to obtain timings.

Outstanding Responses Counting

Figure 13:
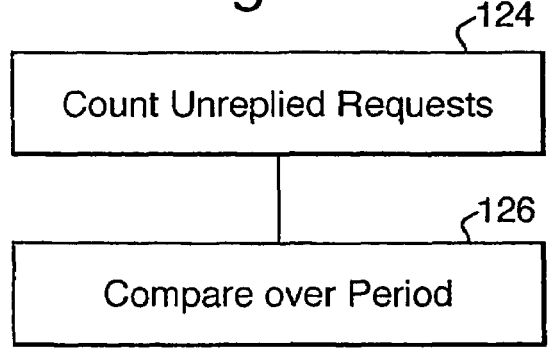
FIG. 13 is a flow chart showing a third embodiment of activity measurement.

As an alternative, the distributor maintains a count of the number of requests sent to each server that has not received at least one response. As this is a continuous measurement, periodic evaluation could be based either on fixed intervals or aggregate numbers of request. As a server becomes overloaded it should show an increase in its outstanding responses. TCP load control is based on this principle. The process is illustrated in FIG. 13 which shows the counting of requests which have received no response at step 124 and the comparison of these counts over a period of time or aggregate number of requests at step 126. However, there are two potential problems. First, the approach is indirectly affected by any normal differences between server response times. This follows from the basic queuing theory formula which states that:

mean concurrency=transactions per second (tps)×
mean response time.

Thus, it is again difficult to distinguish distressed servers from naturally slow servers.

Second, the distributor has to distinguish initial responses to requests from subsequent responses in order that the outstanding response count is only decremented when an initial response is sent. This is difficult to achieve.

Request and Response Counting

Figure 11:
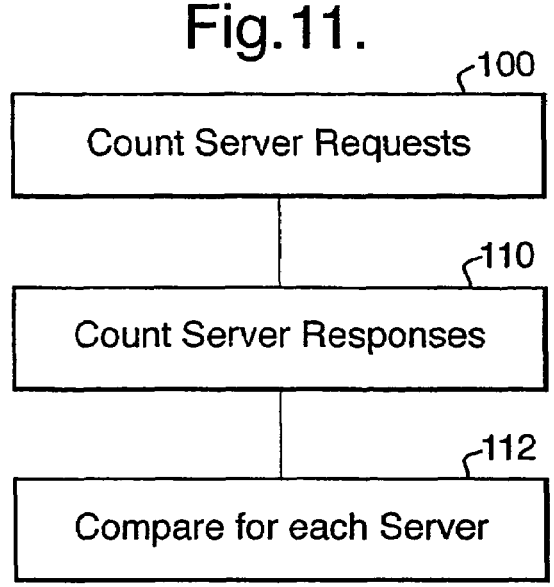
FIG. 11 is a flow chart showing a first embodiment of activity measurement.

This option is the most preferred of the three considered. The distributor records, over a short sample period, the number of requests sent to each server and the number of responses received back from each server. The relative loadings are then evaluated by comparing request and response counts for the sample period. The method is illustrated in FIG. 11 in which server requests are counted at 100, server responses counted at step 110 and a comparison made at step 112. This process is repeated for each server.

The absolute numbers of requests or responses may differ between servers due to the differing capacities. However, provided that none is overloaded the request/response ratio for each should be almost identical. This relies on each server receiving the same mixture of request types, which is true over a large number of requests but may not be reliable over short periods containing few requests. It is preferred therefore, to define samples by aggregate number of requests sent, rather than by time periods.

There are many candidates for the values that might be compared to decide relative loading. A straight ratio of requests to responses is only one alternative. The following is a non-exhaustive list of some candidate quantities and their theoretical ranges. In the list Rq is the number of theoretical requests sent to a server and Rs the number of responses returned.

| | | | |
|---|---|---|---|
| 1. | Rq/Rs : 0 | ⇒ | $+\infty$ |
| 2. | Rs/Rq: 0 | ⇒ | $+\infty$ |
| 3. | Rq-Rs: $-\infty$ | ⇒ | $+\infty$ |
| 4. | Rs-Rq: $-\infty$ | ⇒ | $+\infty$ |
| 5. | Rq/(Rc+Rs): 0 | ⇒ | 1 |
| 6. | Rs/(Rs+Rc): 0 | ⇒ | 1 |
| 7. | (Rq-Rs)/(Rq+Rs): $-1$ | ⇒ | $+1$ |
| 8. | (Rs-Rq)/(Rq+Rs): $-1$ | ⇒ | $+1$ |

Of these candidate values, nos 1 to 4 have unlimited ranges, caused by the possibility of sample periods with zero responses or requests. Options 5 and 6 give greater emphasis to either the request or response count. Theory suggests that it is the normalised difference between requests and responses counts that is the most informative indication of relative server loadings, suggesting that options 7 and 8 are the most preferable. The polarity of the value is one consideration, that is whether it increases or decreases with loading. It is intuitive that the value should increase as loading increases favouring option 7. However, as most protocols spawn, on average, slightly more than one response per request, the last option, option 8 is favoured as the server measurements would be positive under normal conditions.

Figure 9:
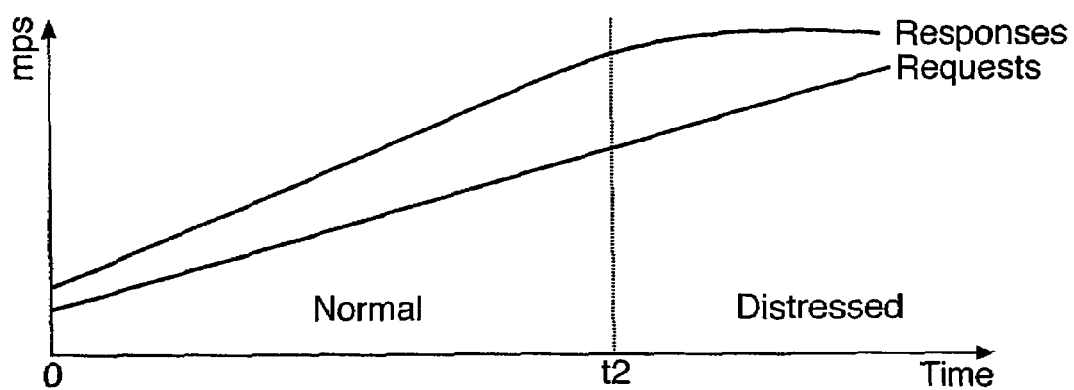
FIG. 9 is a graph of responses and requests for a relatively large server showing the effect of overloading.
Figure 10:
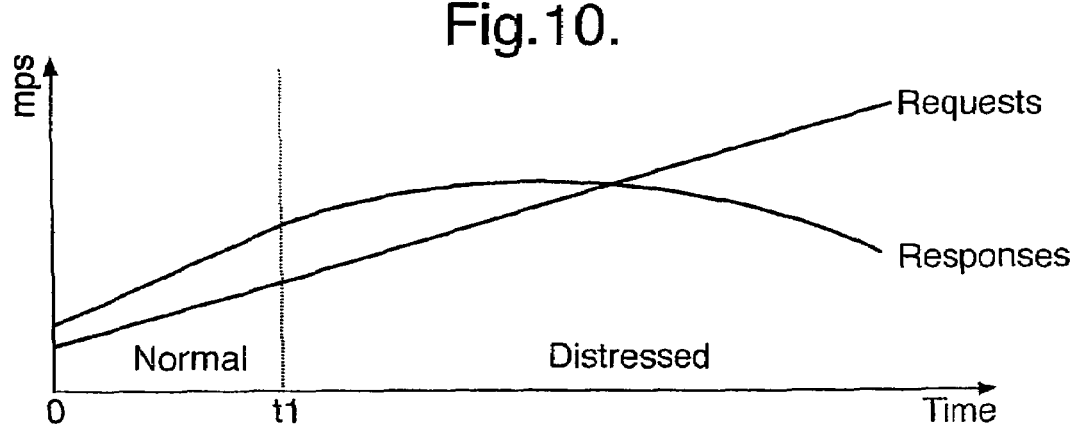
FIG. 10 is a graph of requests and responses for a relatively small server, showing the effect of overloading.

FIGS. 9 and 10 show the request and response counts of two servers as they are subjected to increasing traffic. The figures are both graphs of messages per second (mps) against time. The server of FIG. 9 has a relatively large capacity and that of FIG. 10 a relatively small capacity. The two servers have equal traffic shares. The figures emphasise how the server's response rate plateaus as the server reaches its capacity and becomes distressed. FIGS. 9 and 10 are based on the assumption of an average 1.5 responses per request.

In FIG. 10, the smaller server starts to plateau at time t1. At this time, the distributor should start to shift request traffic to the larger server.

Distribution Adjustment

It was mentioned previously that it is important not to overcompensate any adjustment of the server distribution, so setting up oscillations. Periodically, or after a certain number of requests, the distributor will need to adjust the proportions of request traffic assigned to each server. The objective is to reduce the discrepancies between the per server values of the measurements chosen. This may be done as follows:

If $M_1, M_2, M_3 \ldots M_n$ are the measurements calculated for the last sample period for each server, $\mu$ is their arithmetic mean, and $P_1, P_2, P_3 \ldots P_n$ their currently assigned proportions per server, the new proportion assigned to the rth server is in general given by a formula of the following kind:

$$P_r = f(M_r, \mu, P_r)$$

Two candidate formulae and their theoretical ranges are as follows:

$$Aly^* \Rightarrow$$

$$(1+(M_r-\mu)/(|M_r|+|\mu|)) \times P_r 0 \quad Aly^* \quad 2 \times P_r \qquad 1.$$

$$Aly^* \Rightarrow$$

$$(1-(M_r-\mu)/(|M_r|+|\mu|)) \times P_r 0 \quad Aly^* \quad 2 \times P_r \qquad 2.$$

The difference between the two reflects the polarity choice referred to in the choice between options 7 and 8 above. These formulae produce new values proportional to the old and a proportion must never, therefore, be adjusted to zero due to arithmetic truncation.

Oscillations may be reduced by one of two ways. First, the data from the last few sample periods may be explicitly combined to compute the adjustments to proportions for the next period. This effectively uses a sliding window of retained data. Second, the data from all previous samples may be implicitly combined using a decay formula. Under this approach, data for second period adjustment is the average of true second period data and data from the first period. Data used for the third period is the average of true third period data and data used for the second period etc.

The embodiment described enables distribution of requests to multiple servers from a client node in a manner which reflects the individual capacities of the servers and based on their relative loadings.

Various modifications to the embodiments described are possible and will occur to those skilled in the art. For example, other methods of measuring server activity may be possible and other distribution adjustment formulae may be adopted. However, such modifications are within the scope of the invention which is defined by the appended claims.

The invention claimed is:

1. A method of distributing requests from a client node to servers of a server system having a plurality of servers, the method comprising periodically repeating the steps of:
   a) measuring server activity of each server to obtain measured server activities;
   b) assessing relative loadings of the plurality of servers from the measured server activities;
   c) adjusting a distribution of requests to individual servers of the plurality of servers in accordance with the assessing of the relative loadings by adjusting a proportion of the requests assigned to each server as a function of the measured server activities, a mean activity across the plurality of servers, and an existing proportion of the requests assigned to the respective server;
   d) the measuring step being performed by counting a number of the server requests sent to each of the plurality of servers, and counting a number of the server responses received from each server over a sample period; and
   e) configuring the sample period to be an aggregate number of requests sent to the plurality of servers.

2. The method according to claim 1, wherein the sample period is a period of time.

3. The method according to claim 1, wherein the assessing step is performed by comparing the server requests and responses for each of the plurality of servers over the sample period.

4. The method according to claim 1, wherein the measuring step is performed by calculating a response time of each server.

5. The method according to claim 4, wherein the assessing step is performed by comparing a distribution of the server response times for each of the plurality of servers.

6. The method according to claim 1, wherein the measuring step is performed by counting a number of requests for each server which have not received a response.

7. The method according to claim 6, wherein the assessing step is performed by comparing the number of requests without responses over an aggregate number of requests to all the plurality of servers.

8. The method according to claim 1, wherein the adjusting step is performed by combining distribution data from previous sample periods to calculate adjustments to distributions for a next sample period.

9. The method according to claim 1, wherein the adjusting step is performed by combining data from previous sample periods according to a decay formula.

10. The method according to claim 3, wherein the relative loadings are compared by comparing, for each server, a ratio $(R_q-R_s)/(R_q+R_s)$ where $R_q$ is the number of requests sent to the server, and $R_s$ is the number of responses returned from the server.

11. The method according to claim 3, wherein the relative loadings are compared by comparing, for each server, a ratio $(R_s-R_q)/(R_q+R_s)$ where $R_q$ is the number of requests sent to the server, and $R_s$ is the number of responses returned from the server.

12. A system for distributing requests from a client node to servers of a server system having a plurality of servers, comprising:
   a) a distributor at the client node, the distributor including means for measuring server activity of each server to obtain measured server activities;
   b) means for assessing relative loading of the plurality of servers from the measured server activities;
   c) means for adjusting a distribution of requests to individual servers of the plurality of servers in accordance with the assessing of the relative loadings by adjusting a proportion of the requests assigned to each server as a function of the measured server activities, a mean activity across the plurality of servers, and an existing proportion of the requests assigned to the respective server;
   d) the activity measuring means comprising a counter for counting a number of requests for each server which have not received a response; and
   e) the relative loading assessing means comprising a comparator for comparing the number of requests without responses over an aggregate number of requests to all the plurality of servers.

13. The system according to claim 12, wherein the means for measuring server activity comprises a counter for counting a number of the server requests sent to each of the plurality of servers, and for counting a number of the server responses received from each server over a sample period.

14. The system according to claim 13, wherein the relative loading assessing means comprises means for comparing the server requests and responses for each of the plurality of servers over the sample period.

15. The system according to claim 12, wherein the activity measuring means comprises calculating means for calculating a response time of each server.

16. The system according to claim 15, wherein the relative loading assessing means comprises means for comparing a distribution of the server response times for each of the plurality of servers.

17. The system according to claim 13, wherein the request distribution adjusting means comprises a combiner for combining distribution data from previous sample periods to calculate adjustments to distributions for a next sample period.

18. The system according to claim 14, wherein the means for comparing the server requests and responses compares, for each server, a ratio $(R_q-R_s)/(R_q+R_s)$ where $R_q$ is the number of requests sent to the server, and $R_s$ is the number of responses returned from the server.

19. The system according to claim 14, wherein the means for comparing the server requests and responses compares, for each server, the ratio $(R_s-R_q)/(R_q+R_s)$ where $R_q$ is the number of requests sent to the server, and $R_s$ is the number of responses returned from the server.

* * * * *

UNITED STATES PATENT AND TRADEMARK OFFICE
CERTIFICATE OF CORRECTION

PATENT NO. : 7,519,710 B2
APPLICATION NO. : 10/490040
DATED : April 14, 2009
INVENTOR(S) : Martin It is certified that error appears in the above-identified patent and that said Letters Patent is hereby corrected as shown below:

In Column 4, Line 56, delete "loadings;" and insert -- loadings: --, therefor.

In Column 6, Line 12, delete "nos" and insert -- nos. --, therefor.

In Column 6, Lines 56-62, delete "
$$(1+(M_r-\mu)/(|M_r|+|\mu|)) \times P_c \, 0 \quad Aly^* \Rightarrow 2 \times P_r \quad 1.$$
$$(1-(M_r-\mu)/(|M_r|+|\mu|)) \times P_c \, 0 \quad Aly^* \Rightarrow 2 \times P_r \quad 2.$$
" and insert --
$$1. \quad (1+(M_r-\mu)/(|M_r|+|\mu|)) \times P_c \, 0 \Longrightarrow 2 \times P_r$$
$$2. \quad (1-(M_r-\mu)/(|M_r|+|\mu|)) \times P_c \, 0 \Longrightarrow 2 \times P_r$$
--, therefor.

In Column 8, Line 4, in Claim 10, delete "$R_s$is" and insert -- $R_s$ is --, therefor.

Signed and Sealed this

Twentieth Day of October, 2009

David J. Kappos
*Director of the United States Patent and Trademark Office*